Apr. 17, 1923.
H. M. FRY
TIRE TREAD
Filed March 6, 1922
1,451,820
2 Sheets-Sheet 1
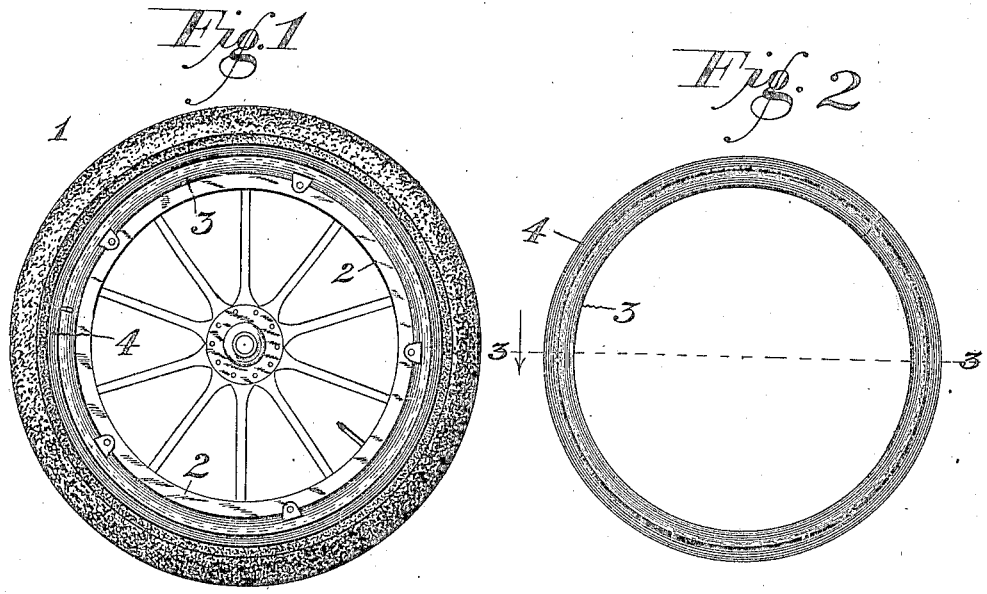
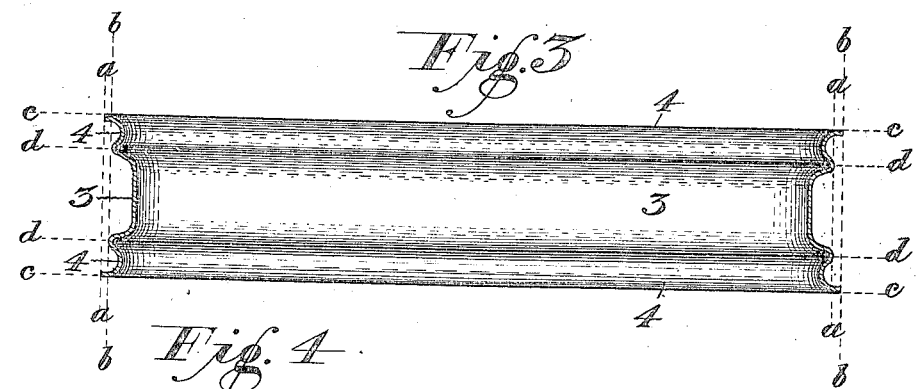
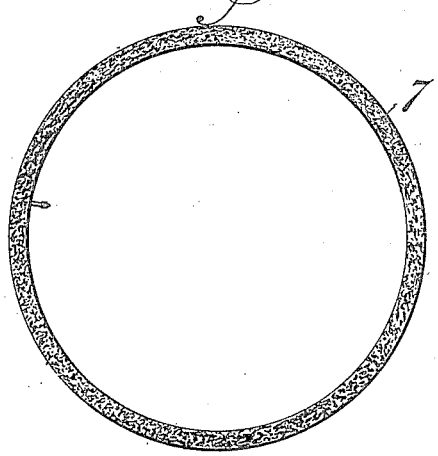
Inventor
Harry M. Fry
By E. E. Overholt
Attorney.

Apr. 17, 1923.

H. M. FRY 1,451,820

TIRE TREAD

Filed March 6, 1922

Inventor
Harry M. Fry
By E. E. Overholt
Attorney.

Patented Apr. 17, 1923.

1,451,820

UNITED STATES PATENT OFFICE.

HARRY M. FRY, OF JOHNSTOWN, PENNSYLVANIA.

TIRE TREAD.

Application filed March 6, 1922. Serial No. 541,501.

*To all whom it may concern:*

Be it known that I, HARRY M. FRY, a citizen of the United States, residing at Johnstown, in the county of Cambria and State of Pennsylvania, have invented certain new and useful Improvements in Tire Treads, of which the following is a specification.

My invention relates to means for securing protecting treads on the pneumatic tires of automobiles, and is an improvement on the means for this purpose shown in my Patent #1,390,900.

My object is to provide means which can be easily attached to the demountable rim of any automobile wheel, or, which, if preferred, can be made integral with said rim, whereby a tread made of rubber or other suitable material may be easily and quickly secured to the demountable rim over a worn shoe to make it last longer, or over a new shoe to protect it.

My former patent, above referred to, showed annular channels held at opposite sides of the metallic rim employed to hold the regular pneumatic tire on the wheel, said channels being rigidly secured to the felly of the wheel; but my present invention shows these channels either made integral with the demountable rim of an automobile wheel or rigidly secured thereto, as may be preferred.

It will also be seen that with my present arrangement, the regular tire may be placed on the demountable rim, and the protecting shoe secured in operative position over the tire, and that the rim, with the protecting shoe on, may then be placed on the wheel in the same manner as any other demountable rim is placed on a wheel.

The above being the case, it will be seen that a number of tires equipped with my improvement, and all inflated and ready for immediate use, may be carried along with the automobile. Hence the advantages of my improvement, in the way of economy and convenience, become apparent.

The invention consists in the novel construction and arrangement of the parts, as will be hereinafter described and claimed, reference being had to the accompanying drawings, in which:—

Fig. 1 is a side elevation of a wheel equipped with my improvement as it appears when made integral with the demountable rim of the wheel.

Fig. 2 shows my improvement as it appears in Fig. 1, but removed from the wheel.

Fig. 3 is a sectional view on an enlarged scale, taken on the line 3—3 of Fig. 2.

Fig. 4 is a side elevation of one of the small pneumatic tubes used with my device.

Figure 5:
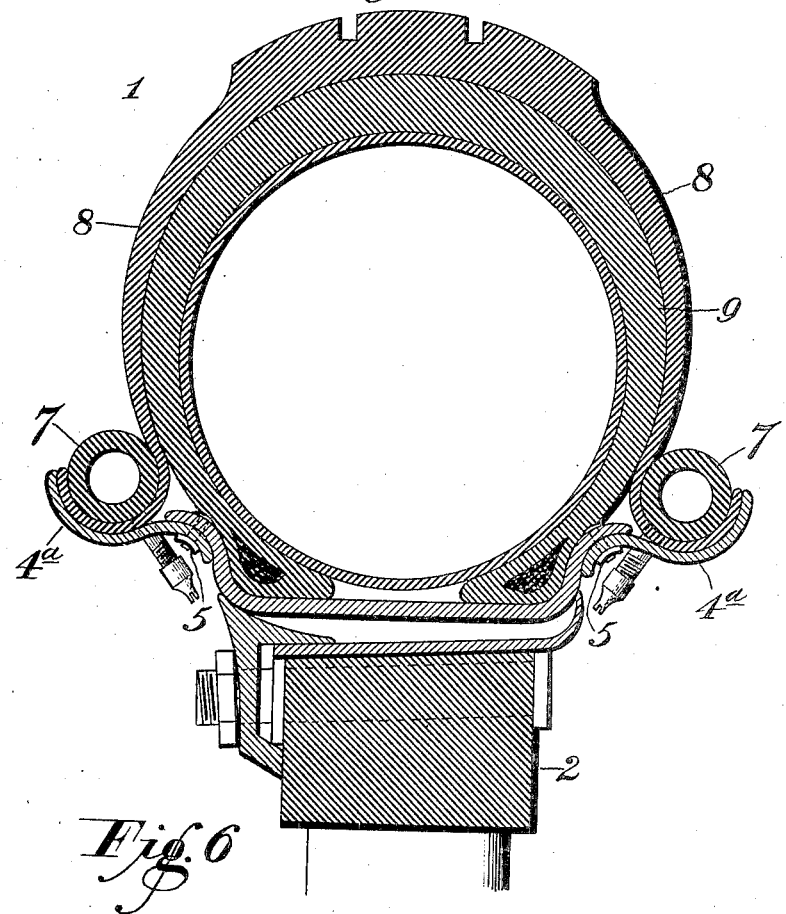
Fig. 5 illustrates a sectional cut through one side of a wheel equipped with my improvement, the annular channels which form extensions of the demountable rim at opposite sides thereof, not being formed integral with the rim as in Fig. 1, but being nevertheless, rigidly secured thereto.
Figure 6:
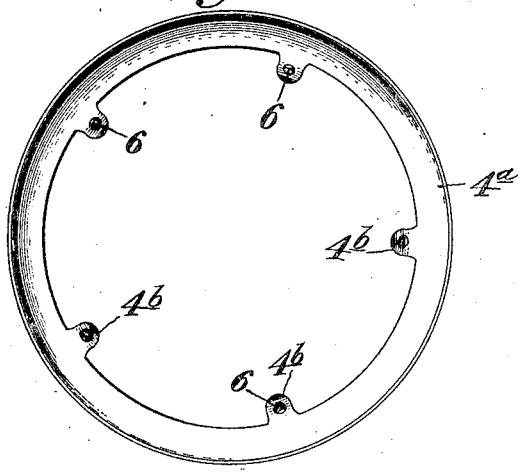
Fig. 6 is a side elevation on a reduced scale, of one of the annular channels shown in Fig. 5.

The numeral 1 indicates an automobile wheel having a felly 2 of ordinary or preferred construction, upon which is suitably secured a demountable rim 3; and on opposite sides of this rim are two annular extension rims or channels 4, which, as shown in Fig. 3, may be brazed, or electrically welded, to the demountable rim 3, or may be rolled out integral therewith when said rim is formed; or these annular extension rims or channels, as indicated by $4^a$ in Figs. 5 and 6, may be provided with lugs $4^b$ by which they are rigidly secured to the outer edges of the demountable rim by bolts or rivets 5 which take through bores 6 in the lugs $4^b$. These annular extensions $4^a$ carry the small pneumatic tubes 7, and also the inner edges of the protecting shoe 8, which edges are clamped between said tubes and said channels when the tubes are inflated, whereby the protecting shoes is securely held on the tire.

In Fig. 3 of the drawings, the usual demountable rim 3 is indicated by the portion of the figure included between the lines $d$—$d$, and the extension rims or channels by the portions included between the lines $c$—$c$ and $d$—$d$.

From both Figures 3 and 5, it will be seen that the outer edges of the annular channels extend diametrically outward farther than any other part of the rim, as indicated in Fig. 3 by the space between the lines $a$—$a$ and $b$—$b$. And as may be seen from Fig. 5, these projecting edges of the annular channels give good protection to the small rubber tubes 7.

It will be seen that these small tubes 7 are spaced from each other a distance only a little less than the outer diameter of the main tire 9, so that when said tire is deflated, the protecting tread may be put on over it with comparative ease.

In the form of the device illustrated in Figs. 5 and 6, we have, for use with a demountable rim, a pair of annular demountable annular channels for engaging a protecting tread to hold it on the main tire of the wheel.

These annular channels or extensions 4$^a$, as illustrated in Figs. 5 and 6, are so constructed as to fit any standard demountable rim, so that all that is necessary to add my improvement to an old wheel, is to provide the demountable rim thereof with suitable bores to register with the bores 6 of the demountable channels for the reception of the securing bolts or rivets 5.

Having now described my invention, what I claim as new and desire to protect by Letters Patent is:—

1. In a device of the character described, the combination with a tire carrying rim having a tire secured thereon, with a protecting tread for the tire provided around its inner edges with annular outwardly curved sections, of annular channels at opposite sides of said rim, said outwardly curved sections of the protecting tread being adapted to be received into said annular channels; and pneumatic tubes of a diameter when deflated to be received into said channels over said annular outwardly curved sections of the protecting tread and when inflated to press said curved sections of the tread into firm engagement with said annular channels to clamp the protecting tread on the tire.

2. The combination with a tire carrying rim having a pneumatic tire thereon, and a protecting tread for the tire provided around its inner edges with annular outwardly curved sections, of annular channels rigidly secured on the rim at opposite sides thereof; said outwardly curved sections of the protecting tread being adapted to be received into said annular channels; and pneumatic tubes of a diameter when deflated to be received into said channels over said annular outwardly curved sections of the protecting tread and when inflated to clamp said curved sections of the protecting tread in firm engagement with said annular channels to hold the protecting tread over the pneumatic tire in engagement with the demountable rim.

3. The combination with a tire carrying rim having a tire secured thereon with a tube inside the tire for inflating the same, of a protecting tread for the outside of the tire, said tread being provided at its inner edges with annular outwardly curved sections of a thickness less than the rest of the tread; annular extensions of the rim at opposite sides thereof; and pneumatic tubes cooperating with said extensions to hold the tread on the rim, the thin outwardly curved sections of the protecting tread being received between the annular extensions of the rim and the pneumatic tubes.

4. The combination with a tire carrying rim and a pneumatic tire carried thereby, of a protecting tread for the tire, said rim being provided at its edges with annular sections curved outwardly away from the tire carried thereby; annular outwardly curved detachable extensions secured to said outwardly turned annular sections of the rim; and independent pneumatic tubes for cooperating with said detachable extensions to hold the protecting tread on the tire.

In testimony whereof I affix my signature.

HARRY M. FRY.